United States Patent

Kennedy et al.

[15] 3,672,486

[45] June 27, 1972

[54] ROLLER CONVEYOR

[72] Inventors: Frank Kennedy, Mount Lebanon Township, County of Allegheny; Thomas C. Roberts, Johnstown, both of Pa.

[73] Assignee: United States Steel Corporation

[22] Filed: Sept. 14, 1970

[21] Appl. No.: 72,056

[52] U.S. Cl...............................198/127, 74/606
[51] Int. Cl....................................B65g 13/02, F16h 57/02
[58] Field of Search...........................198/127; 74/417, 606

[56] References Cited

UNITED STATES PATENTS

| 1,157,311 | 9/1915 | Kuderer | 198/127 X |
| 2,700,451 | 1/1955 | Burkhart | 198/127 |
| 2,748,919 | 6/1956 | Britton et al | 198/127 |
| 3,148,559 | 9/1964 | Stevens | 74/606 |
| 1,735,767 | 11/1929 | Keller et al. | 198/127 |
| 1,611,417 | 12/1926 | Claassen | 198/127 |

Primary Examiner—Evon C. Blunk
Assistant Examiner—Hadd S. Lane
Attorney—Walter P. Wood

[57] ABSTRACT

A roller conveyor of the type in which the rolls are driven from a line shaft. The roll shafts and line shaft have cooperating bevel gears which are placed within light weight housings. All bearings in which the shafts are journaled are separate from the gear housings to avoid need for precision in constructing the housings. Each shaft is journaled in only a single "held" bearing, and the other bearings are "free" to enable the shafts to be shifted axially for adjustment or removal. The line shaft is formed in sections joined end-to-end.

8 Claims, 4 Drawing Figures

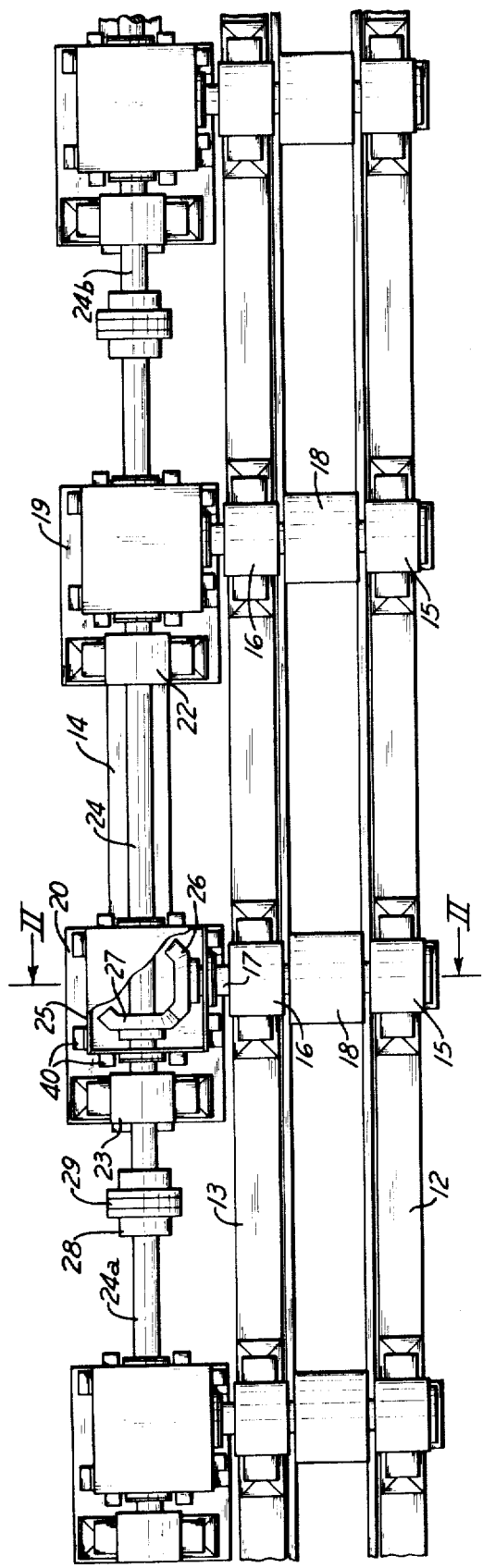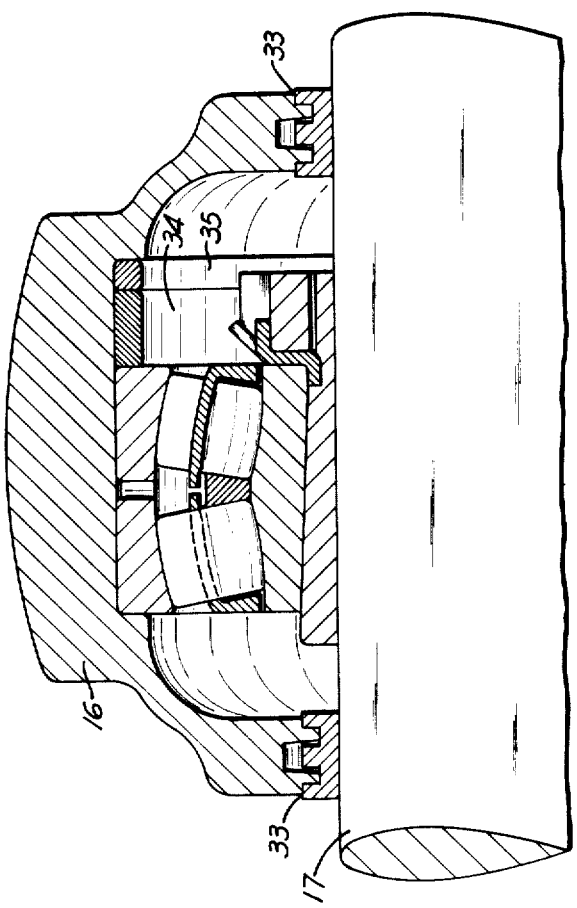
INVENTORS.
FRANK KENNEDY
THOMAS C. ROBERTS
ATTORNEY.

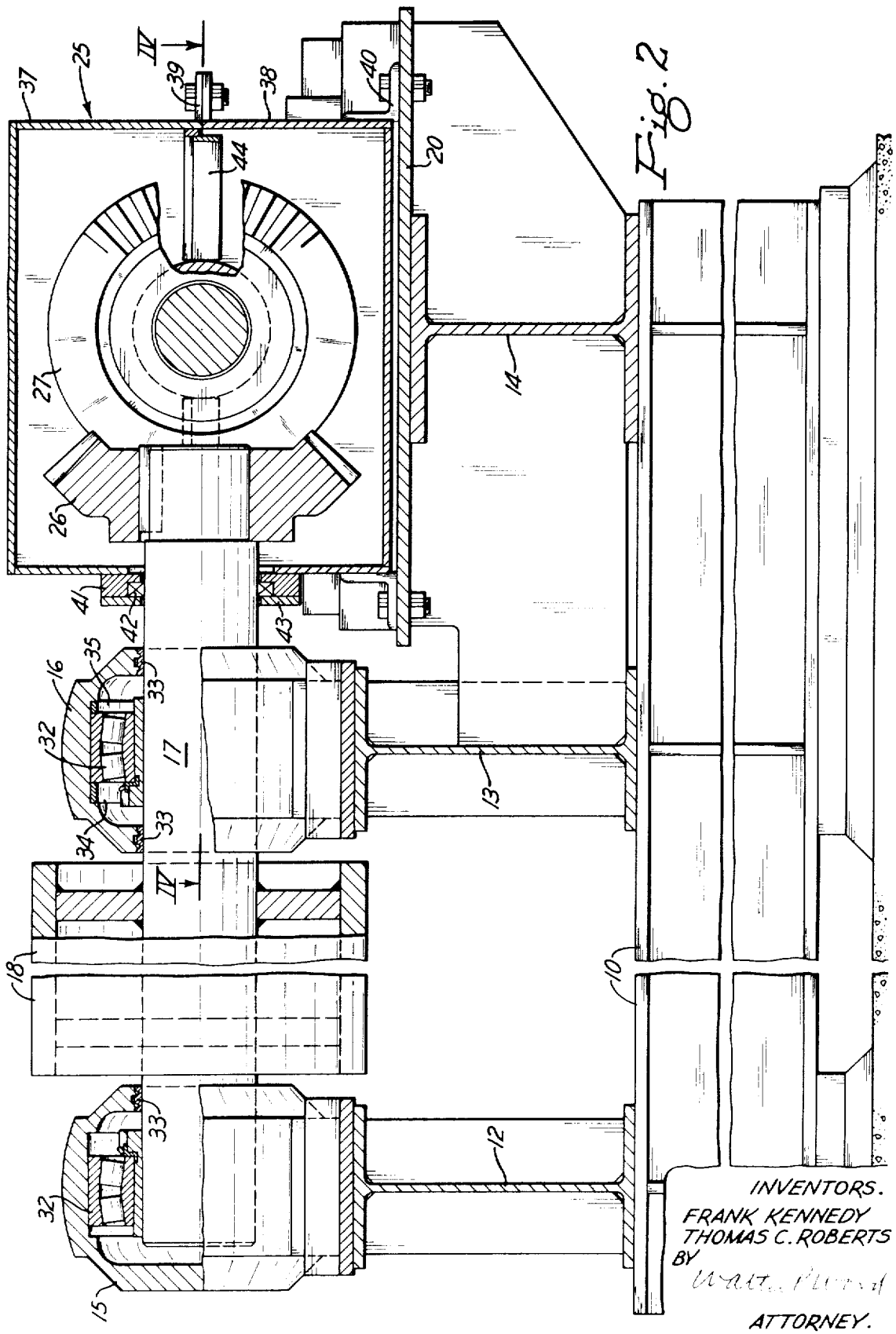

ROLLER CONVEYOR

This invention relates to an improved roller conveyor of the type in which the rolls are driven from a line shaft.

A conventional conveyor of this type includes a fixed supporting structure, bearings mounted on this structure in which the rolls and a power driven line shaft are journaled, and cooperating bevel gears on the line shaft and roll shafts, whereby rotation of the line shaft drives the rolls. Sometimes the line shaft and all the bevel gears are placed within a single housing, or each set of bevel gears may have its own individual housing. Conventionally in either arrangement the gear housing also contains the bearings for the line shaft and one end of each roll shaft. This necessitates the use of heavy cast or fabricated housings, the parts of which must be machined precisely at excessive cost. The line shaft cannot shift axially. Hence installing or removing a line shaft is a difficult and time-consuming operation. It is known to journal the rolls in bearings which permit any single roll to be shifted axially to disengage its bevel gear from the gear on the line shaft and thus convert that particular roll to an idler. Previous arrangements for accomplishing this have necessitated even more costly machining. Before a roll can be shifted, a heavy cover must be lifted from the housing. Despite the advantages, commercial use has been limited. References can be made to Britton et al. U.S. Pat. No. 2,748,919 and Burkhart U.S. Pat. No. 2,700,451 for showings of the foregoing arrangements, both of which permit the rolls, but not the line shaft, to be shifted axially.

An object of our invention is to provide an improved conveyor of the foregoing type which avoids much of the costly machining heretofore required and utilizes simple lightweight parts wherever possible.

A further object is to provide an improved roller conveyor in which we place all bearings in pillow blocks separate from the gear housings, whereby we avoid need for precision in constructing the housings.

A further object is to provide an improved roller conveyor, the individual rolls of which we can shift axially to convert them to idlers, but the construction and operation of which we have simplified over previous arrangements.

A further object is to provide an improved roller conveyor, the line shaft of which we form of axially shiftable sections, facilitating its installation or removal.

A further object is to provide an improved roller conveyor in which we journal each section of the line shaft and each roll in only a single "held" bearing for each, and allow the shaft sections or rolls freedom to move axially with their other bearings.

A further object is to provide an improved roller conveyor in which we can adjust the relative positions of the bevel gears.

In the drawings:

FIG. 1 is a top plan view of a portion of a roller conveyor constructed in accordance with our invention;

FIG. 2 is a vertical cross section on line II II of FIG. 1;

FIG. 3 is a vertical section through one of the "held" bearings of a roll shaft showing the parts in a different position from FIG. 2.

Figure 4:
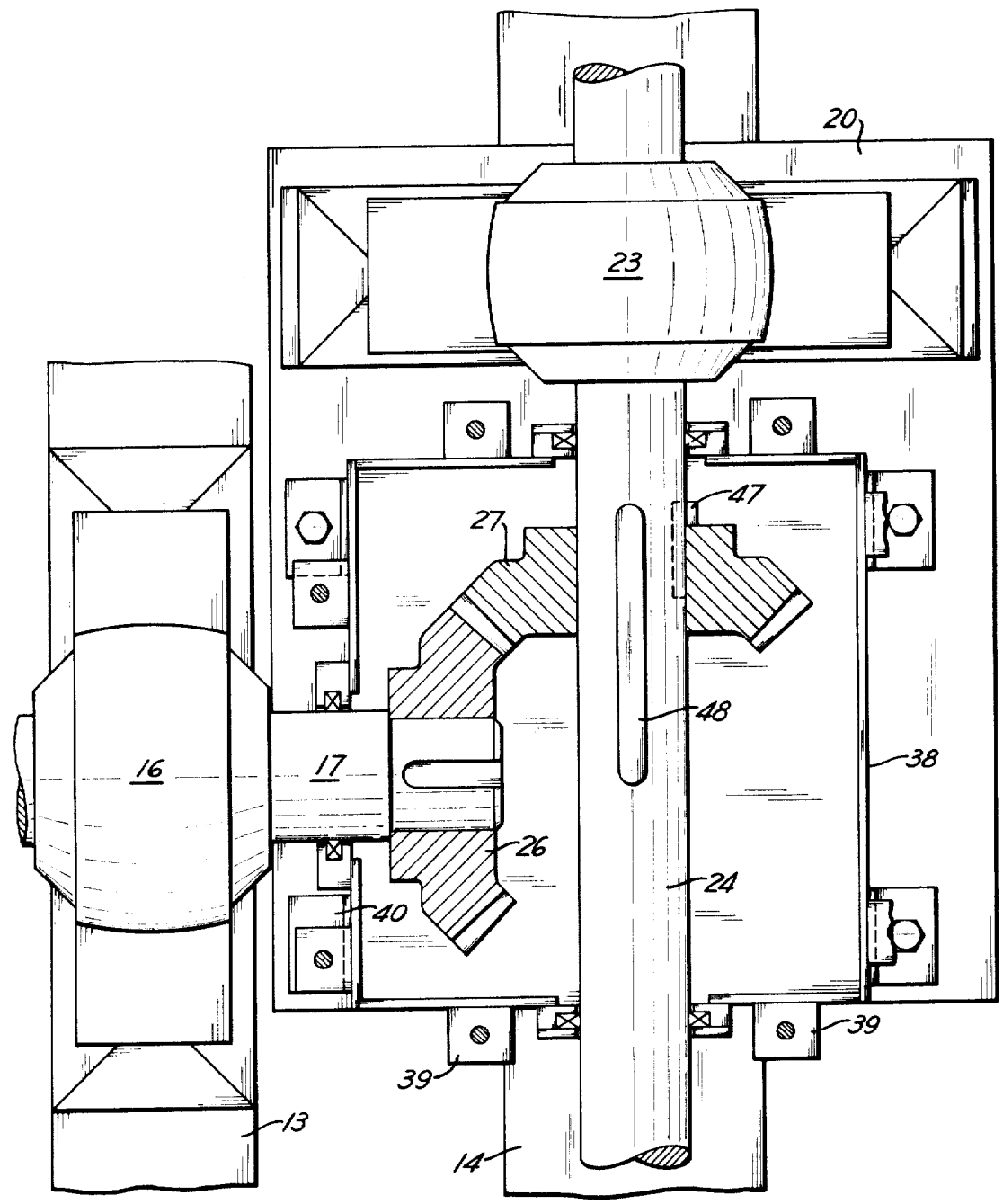
FIG. 4 is a horizontal section on line IV IV of FIG. 2.

Our conveyor has a fixed supporting structure which includes a series of transverse beams 10, longitudinal beams 12 and 13 mounted on beams 10, and a series of shorter longitudinal beams 14 of less height than beams 12 and 13, also mounted on beams 10 (FIG. 2). The upper flanges of beams 12 and 13 carry a plurality of aligned pairs of pillow blocks 15 and 16 which, in accordance with our invention, contain "free" and "held" bearings respectively for shafts 17 of rolls 18. The upper flange of each beam 14 carries a pair of horizontal base plates 19 and 20 adjacent its opposite ends. The base plates carry pillow blocks 22 and 23 which, also in accordance with our invention, contain "free" and "held" bearings respectively for one section 24 of a line shaft. Opposite the pillow blocks 16, the base plates 19 and 20 carry housings 25 for bevel gears 26 and 27 fixed to a roll shaft 17 and to the line shaft section 24 respectively. Further in accordance with our invention, we place all bearings for the line shaft sections and the roll shafts in pillow blocks which are separate from the gear housings. We join the line shaft section 24 end-to-end with other such sections 24a and 24b through couplings 28 which have removable spacers 29. We connect a suitable drive (not shown) to the sectional line shaft. We have shown only a portion of the length of our conveyor, since we repeat the same structure for each section of the line shaft, of which there may be any appropriate number.

Each pillow block 15, which contains one of the "free" bearings for a roll shaft 17, includes upper and lower halves removably bolted together. Within the pillow block we place a conventional antifriction bearing 32 which receives shaft 17. This bearing is free to shift back and forth within the pillow block, whereby the shaft can move axially a sufficient distance to disengage its bevel gear 26 from the bevel gear 27 on the line shaft and also to allow for thermal expansion and contraction. Shaft 17 carries a labyrinth seal 33 at each location where it extends through a wall of either pillow block 15 or 16 to confine lubricant within the pillow block without impeding axial movement of the shaft.

Each pillow block 16, which contains a "held" bearing for a roll shaft 17, is of similar internal construction to the pillow block 15, except that we insert a removable U-shaped spacer 34 and a stabilizer ring 35, normally on opposite sides of the antifriction bearing 32. Together the bearing, spacer and stabilizer ring fill the space within the pillow block. Normally we place the spacer 34 on the side of bearing 32 away from the bevel gear 26, whereby the spacer holds this gear in engagement with the bevel gear 27 on the line shaft. We place the stabilizer ring 35 on the side of the bearing toward the bevel gear 26, whereby the stabilizer ring holds this gear from jamming too closely against the bevel gear 27. We adjust the initial position of gear 26 by selection of a spacer and stabilizer ring of the proper thickness. Later we compensate for wear of the gears merely by changing to a thicker spacer and thinner stabilizer ring. To convert a roll to an idler, we remove the spacer 34, shift the roll axially away from the line shaft to disengage the bevel gears, and re-insert the spacer on the other side of the bearing, as FIG. 3 shows.

The pillow blocks 22 and 23, which contain "free" and "held" bearings for the line shaft section 24 are of the same internal construction as the corresponding pillow blocks 15 and 16. Hence we have not repeated the description. To shift a line shaft section 24 axially for removal or adjustment, we follow the same procedure as in shifting a roll, but in addition we remove spacers 29 from the couplings 28 at the ends of that section. We can use spacers 29 of different thicknesses to position the bevel gears 27 in proper relation in conjunction with using a spacer 34 and stabilizer ring 35 of appropriate thickness for the "held" bearing of the line shaft.

The gear housings 25 serve only to cover the bevel gears 26 and 27 and confine lubricant around the gears. Conveniently we construct these housings of light-gage metal plate (for example ¼-inch steel plate). The housings include upper and lower halves 37 and 38 removably bolted together through mating tabs 39 projecting from their outer edges. We bolt the lower half 38 to one of the base plates 19 or 20, where it is spaced from both the adjacent roll shaft and line shaft bearings. The latter bolts extend through tabs 40 projecting from the lower edge of the bottom half. The halves carry half-glands 41 fixed to their outer faces where each shaft 17 or 24 passes through the housing wall. The half-glands have grooves in which we insert rope-type packing 42 retained by rings 43, also formed in halves. The internal lower edge of the upper half 37 of the housing carries a splash guard 44 which fits within the upper edge of the lower half 38. We need not construct nor position the housings with any great precision, but we can bolt them in place around the gears before we install the half-glands. We can readily position these glands to afford oil-tight seals around the shafts not necessarily perfectly centered with respect to the openings in the housings through which the shafts extend.

Preferably we also utilize a special arrangement of keys for attaching the bevel gears 27 to the line shaft sections 24. As FIG. 4 shows, the shaft section has a slot in one side in which we insert a gib key 47. The gear abuts the gib to position it relatively to the shaft. We can use gibs of different thickness to vary the position of the gear. The shaft section has another longer slot angularly removed from the first slot in which we insert a tapered key 48 and its back-up to hold the gear against the gib.

From the foregoing description, it is seen that our invention affords a simplified roller conveyor which requires a minimum of precision in its manufacture. Any roll is axially shiftable through the simple procedure of removing the upper half of one pillow block which contains its "held" bearing and removing and reinserting a single spacer. We can remove the roll after additionally removing only the upper halves of its other pillow block and of the gear housing. Similarly we can remove sections of the line shaft after removing the upper halves of the appropriate pillow blocks and gear housings and the spacers in the couplings. We locate the "held" bearing of each roll in the pillow block closer to the gears, whereby the roll and its shaft can undergo thermal expansion and contraction toward the "free" bearing. The normal backlash of the gears can accommodate the small dimensional change in the segment of the shaft between the "held" bearing and the gear.

We claim:

1. In a roller conveyor which includes a supporting structure, a plurality of rolls having shafts, a line shaft, respective radial and thrust bearings in which said roll shafts and said line shaft are journaled, cooperating sets of bevel gears on said roll shafts and said line shaft, whereby rotation of said line shaft drives said rolls, and individual housings fixed to said supporting structure and covering each of said sets of gears, the housing walls having openings through which said shafts extend, the improvement comprising aligned pairs of pillow blocks mounted on said supporting structure separately from and all outside said housings, the bearings for both ends of the roll shafts being contained in said pillow blocks, additional pillow blocks mounted on said supporting structure separately from and all outside said housings, the bearings for said line shaft being contained in said additional pillow blocks, and lubricant-confining means mounted in the housing walls where each shaft extends therethrough and being readily positionable in lubricant-tight relation to the respective shafts, whereby need is avoided for precision in the construction of said housings and in the positioning thereof in relation both to said supporting structure and to said shafts, said housings being of lightweight construction and serving only to cover the gears and confine lubricant therefor.

2. A conveyor as defined in claim 1 in which the bearings for any one of said roll shafts include a "free" bearing and a "held" bearing contained in opposite pillow blocks of an aligned pair, the roll shaft being axially shiftable with its "free" bearing, and means in the pillow block containing said "held" bearing preventing axial movement of the roll shaft.

3. A conveyor as defined in claim 2 in which said last-named means includes a U-shaped spacer and a stabilizer ring within the pillow block normally located on opposite sides of the bearing therein.

4. A conveyor as defined in claim 1 in which said line shaft is formed in sections and the bearings for any one section include a "free" bearing and a "held" bearing contained in different pillow blocks, the shaft section being axially shiftable with its "free" bearing, and including means in the pillow block containing said "held" bearing preventing axial movement of the shaft section, and coupling means joining said sections end-to-end.

5. A conveyor as defined in claim 4 in which the means in the pillow block preventing axial shifting of the line shaft section includes a U-shaped spacer and a stabilizer ring normally on opposite sides of the bearing.

6. A conveyor as defined in claim 4 in which the coupling means include removable spacers.

7. A conveyor as defined in claim 1 in which said gear housings are formed of upper and lower halves removably bolted together, said lubricant confining means including half-glands fixed to the respective housing halves where the shafts pass through the housing walls, and packing mounted in said half gland.

8. A conveyor as defined in claim 1 in which the gears are fixed to the respective shafts with gib keys mounted on the shaft and tapered keys holding the gears against the gib keys.

* * * * *